US007797232B2

United States Patent
Kuroda et al.

(10) Patent No.: US 7,797,232 B2
(45) Date of Patent: Sep. 14, 2010

(54) RISK MONITORING APPARATUS, RISK MONITORING SYSTEM, AND RISK MONITORING METHOD

(75) Inventors: Takuya Kuroda, Otsu (JP); Hiroo Kawasaki, Ayabe (JP); Fumihiko Kubo, Kawasaki (JP)

(73) Assignee: Omron Corporation, Kyoto (JP)

( * ) Notice: Subject to any disclaimer, the term of this patent is extended or adjusted under 35 U.S.C. 154(b) by 51 days.

(21) Appl. No.: 12/042,676

(22) Filed: Mar. 5, 2008

(65) Prior Publication Data

US 2008/0255898 A1 Oct. 16, 2008

(30) Foreign Application Priority Data

Mar. 5, 2007 (JP) .............................. 2007-054349

(51) Int. Cl.
*G06Q 40/00* (2006.01)
(52) U.S. Cl. ......................................... 705/38; 705/39
(58) Field of Classification Search .............. 705/10–44
See application file for complete search history.

(56) References Cited

U.S. PATENT DOCUMENTS

| 5,525,967 | A | * | 6/1996 | Azizi et al. .............. 340/572.1 |
| 5,895,436 | A | * | 4/1999 | Savoie et al. ............... 701/214 |
| 6,144,916 | A | * | 11/2000 | Wood et al. ................ 701/200 |
| 6,614,349 | B1 | * | 9/2003 | Proctor et al. ............ 340/572.1 |
| 7,081,818 | B2 | * | 7/2006 | Eckstein et al. .......... 340/572.1 |
| 7,123,146 | B1 | * | 10/2006 | Holzman ................. 340/568.1 |

FOREIGN PATENT DOCUMENTS

| JP | 2005-202744 | 7/2005 |
| JP | 2005-275616 | 10/2005 |
| JP | 2006-92312 | 4/2006 |
| JP | 2006-134242 | 5/2006 |

* cited by examiner

*Primary Examiner*—Frantzy Poinvil
(74) *Attorney, Agent, or Firm*—Dickstein Shapiro LLP

(57) ABSTRACT

A risk monitoring system is formed of a client terminal, a risk management apparatus, and a security device. A risk calculation portion in the risk management apparatus calculates the vulnerability of each room inside the workplace quantitatively in terms of three viewpoints: individuals, assets, and space, and calculates a risk value of an internal crime in each room in real time by multiplying the vulnerability by the internal crime probability and the asset value. A risk analysis portion analyzes a risk state on the basis of the risk value thus calculated and the analysis result is displayed on a display portion of the client terminal. It is thus possible to understand a risk situation of an internal crime against assets to protect in real time for enabling an action to be taken appropriately according to the situation.

7 Claims, 17 Drawing Sheets

FIG. 3

ASSESSMENT TABLE FOR VULNERABILITY OF INDIVIDUAL

| | VULNERABILITY SCORE / ASSESSMENT ITEM | 5 POINTS | 4 POINTS | 3 POINTS | 2 POINTS | 1 POINT |
|---|---|---|---|---|---|---|
| 1 | TYPE OF EMPLOYMENT | DAILY WORKER | SUBCONTRACTOR | PART-TIME EMPLOYEE PART-TIMER | CONTRACTED EMPLOYEE NON-REGULAR STAFF | FULL-TIME EMPLOYEE |
| 2 | ASSETS HANDLING AUTHORIZATION | UNAUTHORIZED | USER | HANDLER | SUB-MANAGER | MANAGER |
| 3 | AGE | 20's OR YOUNGER | 30's | 40's | 50's | 60's OR OLDER |
| 4 | LENGTH OF SERVICE | NON-EMPLOYEE | LESS THAN 1 YEAR | 1 – 14 YEARS | 15 – 29 YEARS | 30 YEAR OR LONGER |
| 5 | FREQUENCY OF USE OF ASSETS (PER MONTH) | 20 TIMES OR MORE | 15 – 19 TIMES | 4 – 14 TIMES | 1 – 3 TIMES | NO USE |
| 6 | NUMBER OF PROCEDURAL MISTAKES (PER MONTH) | 10 TIMES OR MORE | 6 – 9 TIMES | 3 – 5 TIMES | 1 – 2 TIMES | NONE |
| 7 | NUMBER OF ENTRY AND LEAVE ERRORS (PER MONTH) | 15 TIMES OR MORE | 10 – 14 TIMES | 4 – 9 TIMES | 1 – 3 TIMES | NONE |

FIG. 4

RANK TABLE FOR VULNERABILITY OF INDIVIDUAL

| VULNERABILITY LEVEL | | TOTAL POINTS |
|---|---|---|
| RANK | COEFFICIENT | |
| A | 1.0 | 25 – 30 POINTS |
| B | 0.5 | 19 – 24 POINTS |
| C | 0.25 | 13 – 18 POINTS |
| D | 0.125 | 7 – 12 POINTS |
| E | 0.0625 | 6 POINTS |

FIG. 5

INDIVIDUAL BASIS TABLE

| ID | TOTAL POINTS | VULNERABILITY LEVEL |
|---|---|---|
| 0001251 | 15 POINTS | C (0.25) |
| 0001252 | 8 POINTS | D (0.125) |
| 0001253 | 27 POINTS | A (1.0) |
| 0001254 | 6 POINTS | E (0.0625) |
| 0001255 | 20 POINTS | B (0.5) |
| ⋮ | ⋮ | ⋮ |

FIG. 6

ASSESSMENT TABLE FOR VULNERABILITY OF ASSET

| | ASSESSMENT ITEM \ VULNERABILITY LEVEL | A (=1.0) | B (=0.5) | C (=0.25) | D (=0.125) | E (=0.0625) |
|---|---|---|---|---|---|---|
| 1 | PRESENCE OF PROCEDURE NECESSARY WHEN HANDLING ASSET | NO | | | | YES |
| 2 | OPERATION ACCORDING TO PROCEDURE | NOT OPERATED ACCORDING TO PROCEDURE | | | | OPERATED ACCORDING TO PROCEDURE |
| 3 | STORAGE IN SAFE | NOT STORED IN SAFE | STORED IN SOMETHING WITHOUT LOCK | STORED IN SOMETHING WITH LOCK OTHER THAN SAFE | STORED IN SAFE WITH ONE LOCK | STORED IN SAFE WITH TWO OR MORE LOCKS |
| 4 | STRICTNESS IN HANDLING KEY OF SAFE | KEY OF SAFE IS PLACED AROUND THE SAFE AND IS ALWAYS AVAILABLE | KEY IS STORED IN THE SAME SPACE WHERE THE SAFE IS PRESENT WHILE THE SAFE IS UNLOCKED | KEY IS STORED IN THE SAME SPACE WHERE THE SAFE IS PRESENT WHILE THE SAFE IS LOCKED | KEY IS STORED IN A SPACE DIFFERENT FROM SPACE WHERE THE SAFE IS PRESENT WHILE THE SAFE IS UNLOCKED | KEY IS STORED IN A SPACE DIFFERENT FROM SPACE WHERE THE SAFE IS PRESENT WHILE THE SAFE IS LOCKED |
| 5 | IDENTIFICATION OF LOCATION OF ASSET | UNIDENTIFIABLE | UNIDENTIFIABLE BUT ASSET IS IMMOVABLE | LOCATION OF ASSET CAN BE IDENTIFIED IN A PARTIAL REGION | SPACE WHERE THE ASSET IS PRESENT CAN BE IDENTIFIED IN ALL THE REGIONS | COORDINATES CAN BE OBTAINED IN ALL THE REGIONS AND EXACT LOCATION CAN BE IDENTIFIED |
| 6 | DETECTION OF MOVEMENT ERROR OF ASSET | UNDETECTABLE | | | | DETECTABLE IN REAL TIME |
| 7 | ACTION IN EVENT OF LOSS OF ASSET | NO ACTION CAN BE TAKEN | | ACTION CAN BE TAKEN WITHIN 20 MINUTES | ACTION CAN BE TAKEN WITHIN 10 MINUTES | ACTION CAN BE TAKEN WITHIN 5 MINUTES |

FIG. 8

ASSESSMENT TABLE 1 (SPACE OF STORAGE) FOR VULNERABILITY OF SPACE

| | ASSESSMENT ITEMS \ VULNERABILITY LEVEL | A (=1.0) | B (=0.5) | C (=0.25) | D (=0.125) | E (=0.0625) |
|---|---|---|---|---|---|---|
| 1 | PRESENCE OF PLURAL ENTRANCES | TWO OR MORE ENTRANCES | | | | ONLY ONE ENTRANCE |
| 2 | PRESENCE OF ACCESS OPENING TO OUTSIDE | OPENABLE/CLOSABLE WINDOW AS ACCESS TO OUTSIDE | | | | NO WINDOW (OR UNOPENABLE WINDOW) |
| 3 | VIEWABILITY OF ASSET HANDLING | INSIDE THE ROOM IS COMPLETELY VIEWABLE FROM CORRIDOR (ALL WALLS ARE GLASS) | | INSIDE THE ROOM IS VIEWABLE FROM CORRIDOR (WINDOW SILL AT HIP LEVEL) | INSIDE THE ROOM IS UNVIEWABLE FROM CORRIDOR | HANDLING OF ASSET AND SAFE IS UNVIEWABLE FROM CORRIDOR |
| 4 | INSTALLMENT OF MONITOR CAMERA | NOT INSTALLED | | MONITOR CAMERA IS INSTALLED BUT THERE IS A BLIND SPOT WHERE CAMERA CANNOT COVER | MONITOR CAMERA IS INSTALLED AND ENTIRE SPACE CAN BE COVERED WITHOUT ANY BLIND SPOT, BUT REMOTE OPERATION OF CAMERA IS UNAVAILABLE | MONITOR CAMERA IS INSTALLED AND ENTIRE SPACE CAN BE COVERED WITHOUT ANY BLIND SPOT AND REMOTE OPERATION OF CAMERA IS AVAILABLE |
| 5 | OPERATION OF ENTRY AND LEAVE MANAGEMENT APPARATUS | NOT OPERATED (OR APPARATUS ITSELF IS NOT INSTALLED) | | | | OPERATED |
| 6 | WHETHER INDIVIDUAL ENTERING THE ROOM CAN BE IDENTIFIED | ANYONE WITH ID IS ALLOWED TO ENTER | | ACCESS TO THE ROOM IS RESTRICTED DEPENDING ON AUTHORIZATION LEVEL (TAILGATING IS UNDETECTABLE) | ACCESS TO THE ROOM IS RESTRICTED DEPENDING ON AUTHORIZATION LEVEL (TAILGATING IS DETECTABLE) | ACCESS TO THE ROOM IS RESTRICTED DEPENDING ON AUTHORIZATION LEVEL, AND INFORMATION ABOUT THE NUMBER OF INDIVIDUALS AND LOCATIONS IN THE ROOM CAN BE OBTAINED |

FIG. 9

ASSESSMENT TABLE 2 FOR VULNERABILITY OF SPACE (SPACE OF USE)

| | VULNERABILITY LEVEL<br>ASSESSMENT ITEM | A<br>(=1.0) | B<br>(=0.5) | C<br>(=0.25) | D<br>(=0.125) | E<br>(=0.0625) |
|---|---|---|---|---|---|---|
| 7 | FREQUENCY OF LOSS OF FIXTURES | FREQUENT | | OCCASIONALLY | | NO OCCASION |
| 8 | PRESENCE OF RULE TO MAKE REPORT UPON OCCURRENCE OF PROBLEM | NO | | | | YES |
| 9 | CAPABILITY OF TAKING QUICK ACTION UPON OCCURRENCE OF PROBLEM | NO | | | | YES |
| 10 | MUTUAL RECOGNITION OF EMPLOYEES | FACES, NAMES, AND POSITIONS ARE TOTALLY UNKNOWN | | FACES AND NAMES ARE KNOWN BUT NO FURTHER INFORMATION | | FACES, NAMES, AND POSITIONS ARE ALL KNOWN |
| 11 | ENTRY AND LEAVE OF INDIVIDUAL WITHOUT ID | ALLOWED | | | | INHIBITED |
| 12 | PRESENCE OF ACCESS DOOR TO OUTSIDE | YES | | | | NO |
| 13 | PRESENCE OF DOOR ALWAYS OPEN OR FREE-ACCESS DOOR | YES | | | | NO |
| 14 | PRESENCE OF ACCESS OPENING TO OUTSIDE | YES | | | | NO |
| 15 | IDENTIFICATION OF INDIVIDUAL AROUND ASSET | UNIDENTIFIABLE | | | ATTRIBUTES AND NUMBER OF INDIVIDUALS AROUND ASSET CAN BE OBTAINED | ATTRIBUTES AND LOCATIONS (COORDINATES) OF INDIVIDUALS AROUND ASSET CAN BE OBTAINED |

| | | | | | |
|---|---|---|---|---|---|
| 16 | VIEWABILITY OF ASSET HANDLING | STATE OF USE OF ASSET IS VIEWABLE WITHOUT ANYTHING BLOCKING LINE OF SIGHT | | | AREA FOR USE OF ASSET IS RESTRICTED AND LINE OF SIGHT IS BLOCKED BY PARTITIONS |
| 17 | INSTALLMENT OF MONITOR CAMERA | NOT INSTALLED | MONITOR CAMERA IS INSTALLED BUT THERE IS A BLIND SPOT WHERE CAMERA CANNOT COVER | MONITOR CAMERA IS INSTALLED AND ENTIRE SPACE CAN BE COVERED WITHOUT ANY BLIND SPOT, BUT REMOTE OPERATION OF CAMERA IS UNAVAILABLE | MONITOR CAMERA IS INSTALLED AND ENTIRE SPACE CAN BE COVERED WITHOUT ANY BLIND SPOT AND REMOTE OPERATION OF CAMERA IS AVAILABLE |
| 18 | PRESENCE OF SOMETHING AVAILABLE TO HIDE ASSET | YES (DUST BOX, ETC.) | | | NO |
| 19 | BRINGING-IN OF PERSONAL BELONGINGS | ALLOWED (BAG, ETC.) | | | INHIBITED |

CALCULATION ALGORITHM OF VULNERABILITY OF SPACE

# RISK MONITORING APPARATUS, RISK MONITORING SYSTEM, AND RISK MONITORING METHOD

BACKGROUND OF THE INVENTION

1. Field of the Invention

The present invention relates to a monitoring apparatus, a monitoring system, and a monitoring method for dynamically monitoring a risk of an internal crime inside a workplace, such as a company.

2. Background Art

In places such as companies, an internal crime by an employee often raises a problem. The internal crime is defined as an act of stealing assets inside a workplace, such as money, equipment, commodities, and information, by an employee who has authorized access to the workplace. According to penal modi operandi of thief, the internal crime is classified into an employee theft and a workplace theft. The employee theft is an act of stealing money and goods of the employer by an employee in a store. The workplace theft is an act of stealing money and goods from a workplace by an employee of a company. The employee theft and the workplace theft are referred to collectively as "crime targeting workplace". According to the National Police Agency in Japan, the number of internal crime cases (crimes targeting workplace) has more than doubled to 2251 in 2005 from 1008 in 1998.

Under these circumstances, workplaces such as companies are now constructing a security system by introducing various types of security devices to protect the assets, such as money and equipment, against an internal crime. A risk management for taking an action appropriately by assessing a risk that can cause a loss of assets is now put into operation. In the risk management system in the related art, however, information about a risk is inputted manually. This makes it impossible to understand the state of a risk in real time. Accordingly, in the event that a crucial risk that can lead to an internal crime is occurring, an action against the risk is taken too late and assets will be stolen.

JP-A-2006-92312 describes a device configured to find out a crime probability in a desired area with ease and high accuracy by computing a crime probability on the basis of a value, which is found by dividing a distance to the nearest station by the number of workplaces in a specific area, and another value, which is found by dividing the population by the number of employees, and displaying the crime probability thus computed.

With the device described in this reference, it is easy to understand a static risk under a particular condition. However, because the device is not configured so as to monitor the situation of a risk that changes from moment to moment in real time, there is a problem that a risk of an internal crime corresponding to a change in the environment cannot be determined dynamically.

JP-A-2006-134242 describes a system configured to provide various services, such as notifying a lost article, by reading information of RFIC tags attached to articles or individuals using a tag reader and determining the situation of articles or the relation between the articles and individuals on the basis of the information thus read. This reference, however, fails to disclose the use of this system for dynamically monitoring a risk of an internal crime inside a workplace to calculate the risk quantitatively.

As has been described, there is no system in the related art that is capable of dynamically monitoring a risk of an internal crime inside a workplace to enable an action to be taken appropriately.

SUMMARY OF THE INVENTION

An object of the invention is to provide a risk monitoring device, a risk monitoring system, and a risk monitoring method that make it possible to understand a risk situation of an internal crime against the assets to protect in real time for enabling an action to be taken appropriately according to the situation.

A risk monitoring apparatus according to an aspect of the invention is a risk monitoring apparatus connected to a security device for monitoring a risk inside a workplace, including: a first monitor portion that monitors an asset in a specific place inside the workplace; a second monitor portion that monitors an individual inside the workplace; an analysis portion that analyzes a risk state in the specific place on the basis of information about the asset being monitored by the first monitor portion and information about the individual being monitored by the second monitor portion; and an output portion that outputs an analysis result by the analysis portion.

A condition for the stealing to happen in a given place inside the workplace is the presence of an asset at this place. In the absence of the asset, there is no risk of an internal crime without the trouble of considering other factors. In the presence of the asset, the presence of an individual at this place is a next concern. When there is no individual even in the presence of the asset, there is no risk of an internal crime. Hence, in order to understand a risk of an internal crime, at least the monitor result of asset and the monitor result of individual are necessary. In the invention, a risk at a specific place inside the workplace is analyzed on the basis of the monitor result of asset and the monitor result of individual and then outputted. It is thus possible to understand a risk situation of an internal crime against the assets to protect in real time, which enables an action to be taken appropriately according to the situation.

In a preferred embodiment of the invention, the risk monitoring apparatus further includes a first calculation portion that calculates a vulnerability of the individual being monitored by the second monitor portion quantitatively on the basis of identification information of the individual, and the analysis portion analyzes the risk state on the basis of the vulnerability of the individual calculated in the first calculation portion. According to this configuration, because the vulnerability of individual is calculated quantitatively, it is possible to understand a risk of an internal crime accurately.

In another preferred embodiment of the invention, the risk monitoring apparatus further includes a second calculation portion that calculates a vulnerability of the asset being monitored by the first monitor portion and a vulnerability of a space where the asset is present quantitatively on the basis of information about the asset; and a third calculation portion that calculates a comprehensive vulnerability quantitatively on the basis of the vulnerability of the individual calculated in the first calculation portion, the vulnerability of the asset calculated in the second calculation portion, and the vulnerability of the space calculated in the second calculation portion, wherein the analysis portion analyzes the risk state on the basis of the comprehensive vulnerability calculated in the third calculation portion. According to this configuration, in addition to the vulnerability of individual, the vulnerability of asset and the vulnerability of space are calculated quantitatively, and the comprehensive vulnerability is calculated quantitatively from these vulnerabilities. It is thus possible to understand a risk of an internal crime more accurately.

In still another preferred embodiment, the risk monitoring apparatus further includes: a fourth calculation portion that calculates a probable maximum loss (PML) through computation of an equation:

$$PML = N \times F \times A$$

where F is a value of the comprehensive vulnerability, A is an asset value, and N is a probability of an internal crime by an individual inside the workplace given by $N = k \cdot X$, where k is a constant and X is the number of employees in the workplace. According to this configuration, because PML, which is the final risk value, is calculated quantitatively from the comprehensive vulnerability, the asset value, and the internal crime probability, it is possible to understand a risk of an internal crime further more accurately.

In the invention, by further providing a storage portion that stores plural steps of scores pre-set for attributes of individuals and measurement results of a specific behavior of the individuals, and plural steps of levels pre-set according to total values of the scores, the first calculation portion becomes able to calculate the vulnerability of the individual quantitatively on the basis of the scores and the levels stored in the storage portion.

Also, in the invention, by further providing a storage portion that stores plural steps of levels pre-set for respective assessment items relating to an operation of the asset, and plural steps of levels pre-set for respective assessment items relating to an action for the asset, the second calculation portion becomes able to calculate the vulnerability of the asset quantitatively on the basis of the respective levels stored in the storage portion.

Further, in the invention, by further providing a storage portion that stores plural steps of levels pre-set for respective assessment items relating to a space of storage of the asset, and plural steps of levels pre-set for respective assessment items relating to a space of use of the asset, the second calculation portion becomes able to calculate the vulnerability of the space quantitatively on the basis of the respective levels stored in the storage portion.

In addition, a risk monitoring system according to another aspect of the invention includes the risk monitoring apparatus described above, and a security device connected to the risk monitoring apparatus.

Further, a risk monitoring method according to still another aspect of the invention is a risk monitoring method that uses the risk monitoring apparatus described above and includes the followings:

(1) monitoring the asset in the specific place inside the workplace with the first monitor portion;

(2) monitoring the individual inside the workplace with the second monitor portion;

(3) analyzing the risk state in the specific place on the basis of the information about the asset being monitored by the first monitor portion and the information about the individual being monitored by the second monitor portion in the analysis portion; and (4) outputting the analysis result in the analysis portion by the output portion.

According to the invention, because a risk situation of an internal crime against the assets to protect can be understood in real time, it is possible to take an action appropriately according to the situation.

BRIEF DESCRIPTION OF THE DRAWINGS

FIG. 3 is an example of an assessment table to assess the vulnerability of individual;

FIG. 4 is an example of a rank table;

FIG. 5 is an example of an individual basis table;

FIG. 6 is an example of an assessment table to assess the vulnerability of asset;

FIG. 8 is an example of an assessment table to assess the vulnerability of a space of storage;

FIG. 9 is an example of an assessment table to assess the vulnerability of a space of use;

DETAILED DESCRIPTION OF THE INVENTION

Figure 1:
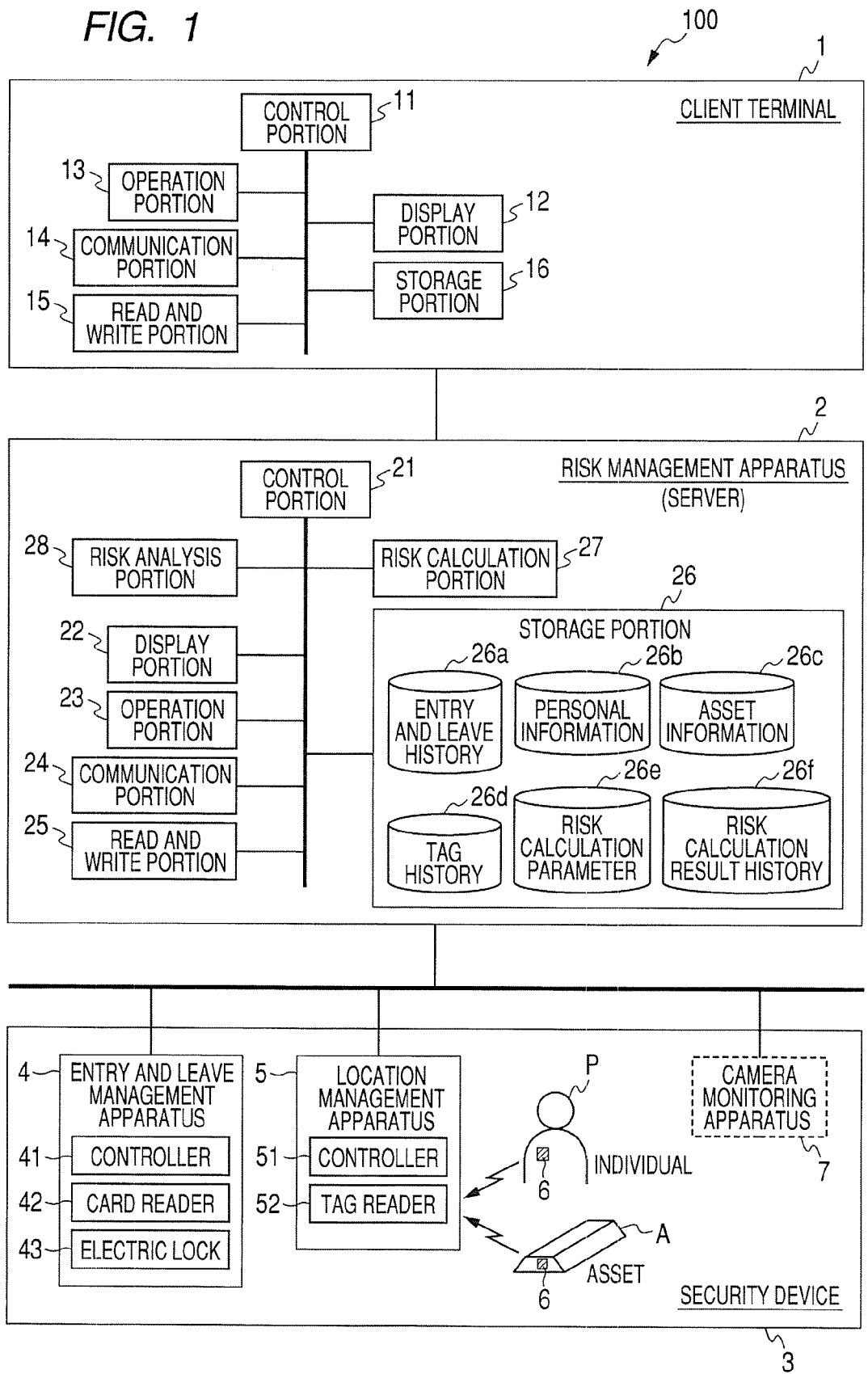
FIG. 1 is a view showing the configuration of a risk monitoring system according to one embodiment of the invention.

FIG. 1 is a view showing the configuration of a risk monitoring system 100 according to one embodiment of the invention. The risk monitoring system 100 is operated in each workplace to protect the assets, such as money, equipment, commodities, and information, owned by a workplace, such as a company, against an internal crime by an employee. It goes without saying that the assets are at risk of stealing not only by an internal crime but also by an external crime, and in practice, risk monitoring on an external crime is also performed along risk monitoring on an internal crime described below. However, because the former is not directly related to the invention, descriptions thereof are omitted herein.

The risk monitoring system 100 is formed of a client terminal 1, a risk management apparatus 2, and a security device 3. The client terminal 1 and the risk management apparatus 2 together form a risk monitoring apparatus.

The client terminal 1 is formed of, for example, a personal computer, and installed in a management office inside the workplace. The client terminal 1 is electrically connected to the risk management apparatus 2. A control portion 11 is formed of a CPU, a memory, and so forth. A display portion 12 is formed of a display, such as a CRT or an LCD. An operation portion 13 is formed of a mouse and a keyboard. A communication portion 14 is formed of a modem and a known interface circuit, and so forth. A read and write portion 15 is formed of a known disc drive or card reader that reads and writes information in and from an information recording medium, such as a magnetic disc, an optical disc, and a memory card. A storage portion 16 is formed of a memory and a hard disc. The client terminal 1 forms one embodiment of an output portion of the invention.

The risk management apparatus 2 is formed of a server and installed in the management office or the like inside the workplace. Both the client terminal 1 and the security device 3 are electrically connected to the risk management apparatus 2. Only one risk management apparatus 2 is shown in FIG. 1. However, there is a case where more than one risk management apparatus 2 is provided in a one-to-one correspondence with respective devices included in the security device 3. A control portion 21, a display portion 22, an operation portion 23, a communication portion 24, and a read and write portion 25 are the same as the control portion 11, the display portion 12, the operation portion 13, the communication portion 14, and the read and write portion 15, respectively, in the client terminal 1 described above. The risk management apparatus 2 forms one embodiment of a monitor portion, a calculation portion, and an analysis portion of the invention.

A storage portion 26 accommodates various types of databases (hereinafter, abbreviated as DBs) 26a through 26f. Reference numeral 26a denotes an entry and leave history DB in which information about the history of entry and leave is recorded. Reference numeral 26b denotes a personal information DB in which personal information (name, position, ID, and other attributes) of employees is recorded. Reference numeral 26c denotes an asset information DB in which information (the name of assets, places of storage, quantities, values, IDs, and so forth) about the assets, such as money and equipment, is recorded. Reference numeral 26d denotes a tag history DB in which information read from RFIC tags attached to individuals and assets is recorded as a history. Reference numeral 26e denotes a risk calculation parameter DB in which parameters necessary to calculate a risk are recorded. Reference numeral 26f denotes a risk calculation result history DB in which the results of risk calculation are recorded as a history. Although programs to calculate and analyze a risk and various types of management programs are pre-installed in the storage portion 26, these programs are omitted in FIG. 1 for ease of illustration. The storage portion 26 forms one embodiment of a storage portion of the invention.

Reference numeral 27 denotes a risk calculation portion, and calculates a risk quantitatively by reading out necessary information from the storage portion 26. Reference numeral 28 is a risk analysis portion and analyzes a risk state on the basis of a calculation result in the risk calculation portion 27. The calculation and analysis of a risk will be described in detail below.

The security device 3 includes an entry and leave management apparatus 4 and a location management apparatus 5. Besides these pieces of apparatus, a camera monitoring apparatus 7 is provided when the necessity arises. Further, a personal identification apparatus and an alarming and reporting device may be provided additionally.

The entry and leave management apparatus 4 includes a controller 41, a card reader 42, and an electric lock 43. The card reader 42 is an apparatus installed at the entrance of each room to which access should be restricted to read an ID recorded in an IC card owned by an individual. The electric lock 43 locks and unlocks the room door. The controller 41 checks the ID read by the card reader 42 against IDs assigned to individuals who have authorized access to the room and acquired from the personal information DB 26b in the risk management apparatus 2 to determine whether the two IDs match. It controls the electric lock 43 on the basis of the determination result so as to allow or inhibit the entry and leave at the door. The processing result in the entry and leave management apparatus 4 is sent to the risk management apparatus 2 in each occasion and recorded in the entry and leave history DB 26a.

The location management apparatus 5 includes a controller 51 and a tag reader 52. The tag reader 52 is an apparatus that reads IDs recorded in RFIC tags (hereinafter, referred to simply as the tags) 6 attached to individuals P or assets A. The tag readers 52 are provided in many places including the rooms, the floors, the corridors and so forth inside the workplace, and read the IDs of individuals P or assets A present in any of these places by making wireless communications with the tags 6. Also, each tag reader 52 is assigned with an ID corresponding to the places. Hence, when the tag reader 52 reads the ID of a given tag 6, it sends the read tag ID together with its own ID to the risk management apparatus 2 via the controller 51 in each occasion. The risk management apparatus 2 records the information thus sent in the tag history DB 26d. It is possible to manage the location of an individual P or an asset A on the basis of the ID of the tag 6 and the ID of the tag reader 52 that has read the ID of the tag 6. The management of locations of assets using tags is described, for example, in JP-A-2005-202744 and JP-A-2005-275616.

Figure 2:
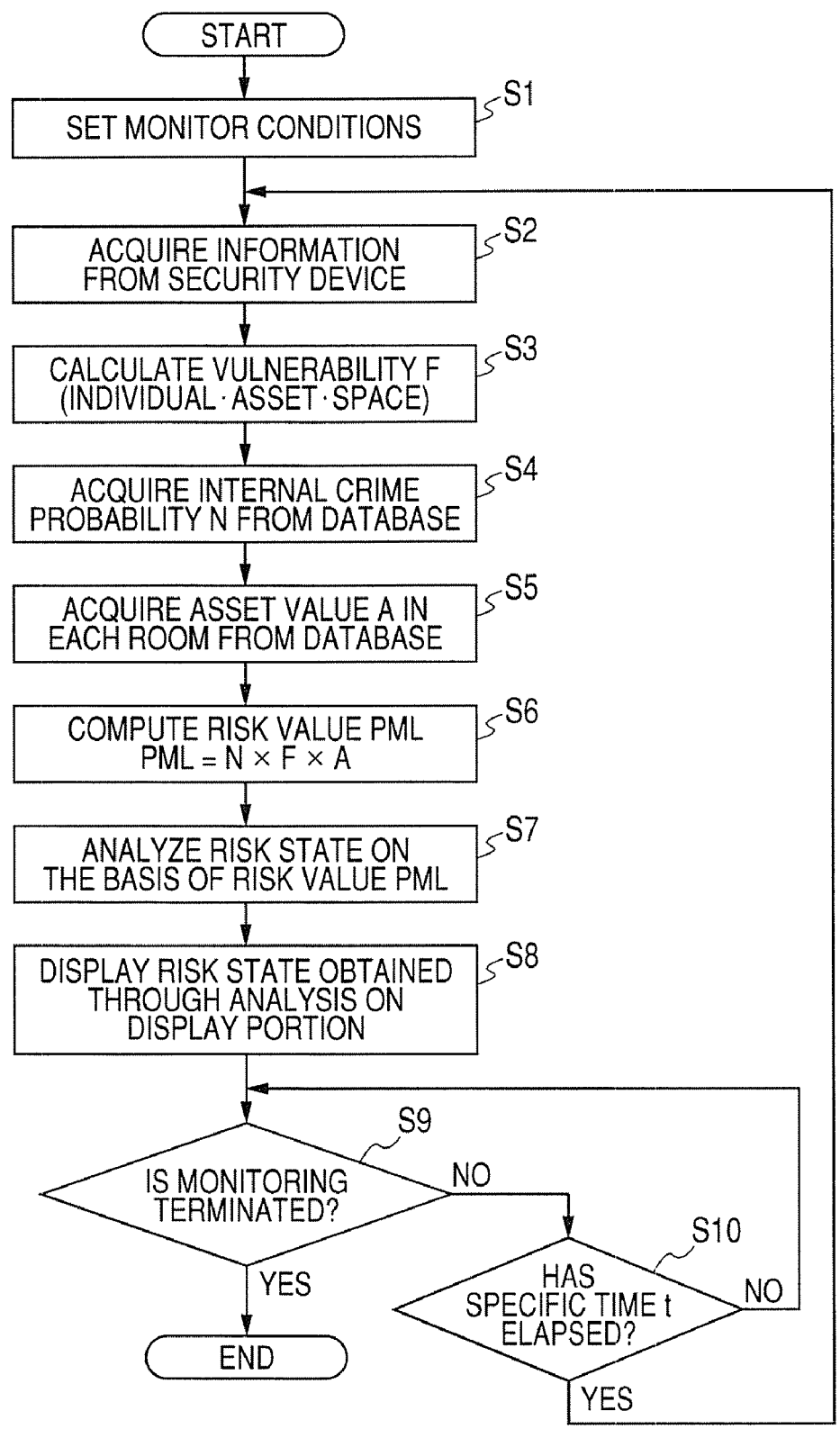
FIG. 2 is a flowchart detailing a basic operation of the risk monitoring system.

FIG. 2 is a flowchart detailing a basic operation of the risk monitoring system 100 described above.

In Step S1, conditions under which a risk is monitored are set in the client terminal 1. For example, information to specify an asset or a place to be monitored is inputted with the use of the operation portion 13 and the conditions are set in the control portion 11 on the basis of this input information. Alternatively, information specifying the object to be monitored is registered in advance, so that the control portion 11 sets the monitor conditions automatically on the basis of the registered contents. The monitor conditions thus set are sent to the risk management apparatus 2. It is also possible to set the monitor conditions in the risk management apparatus 2.

In Step S2, the risk management apparatus 2 acquires security information in real time from the security device 3 under the monitor conditions that have been set. To be more concrete, information about the ID read by the card reader 42, the matching result, and the situation of entry and leave is acquired as the security information of the entry and leave management apparatus 4. Also, as the security information of the location management apparatus 5, information about the ID of an individual P or an asset A read by the tag reader 52 and the ID of the tag reader 52 is acquired. The security information acquired from the entry and leave management apparatus 4 and the security information acquired from the location management apparatus 5 are stored into the entry and leave history DB 26a and the tag history DB 26d, respectively.

In Step S3, the risk calculation portion 27 in the risk management apparatus 2 calculates a vulnerability F. The term, "vulnerability", referred to herein means a parameter indicating the degree of a risk that an asset at a specific location inside the workplace is stolen by an internal crime, and assessed from three factors: the vulnerability of individual (individuals who are highly likely to commit a crime), the vulnerability of asset (the ease of stealing in terms of management and operation), and the vulnerability of space (the circumstances that make it easy to commit a crime). A concrete method of calculating the vulnerability will be described in detail below.

In Step S4, the risk calculation portion 27 acquires the probability N of an internal crime from the risk calculation parameter DB 26e. The probability N is a parameter that indicates the frequency of occurrences of an internal crime (theft) by an employee or the like inside the workplace. The value of N is found, for example, by the multiplication between a value, which is found by dividing the number of internal crime cases (crimes targeting workplace) occurred in the prefecture where the workplace belongs by a total number of employees in this prefecture, and the number of employees in the workplace. For instance, given that the number of annual internal crime cases in a given prefecture is 200 and a total number of employees in this prefecture is 500,000, then the internal crime probability N in a workplace having 1,000 employees is found as:

$N=(200/500,000)\times 1,000=0.4$ case/employee/year.

Hence, in this workplace, an internal crime would occur at an annual rate of 0.4 case. As the figure specifying the number of internal crime cases, the value disclosed by the Police Department that keeps the workplace under control may be adopted. When such a figure is not disclosed, the number of internal crime cases is assumed to be found as:

the number of non-intrusive theft cases$\times 0.01$ on the ground that internal crimes account for about 1% of non-intrusive thefts (thefts that accompany neither the act of vandalism nor the act of intrusion) (according to the report on the criminal statistics disclosed by the National Police Agency).

In Step S5, the risk calculation portion 27 acquires the asset value A in each room from the asset information DB 26c. The asset value A is information about various assets, such as money, the equipment, the commodity, and the information, stored in each room expressed as an amount of money, such as three millions yen and ten millions yen.

In Step S6, the risk calculating portion 27 calculates a risk value PML (Probable Maximum Loss) on the basis of the vulnerability F, the internal crime probability N, the asset value A obtained in Steps S3 through S5, respectively, in accordance with the following equation:

PML=internal crime probability (N)$\times$vulnerability (F)$\times$asset value (A)     (1).

The PML is the risk value that indicates the degree of the final risk that the asset in the room in question would be stolen. As can be understood from the equation above, the risk value PML is expressed as an amount of money. The risk value PML thus calculated is stored in the risk calculation result history DB 26f.

In Step S7, the risk analysis portion 28 analyzes the risk state on the basis of the risk value PML obtained in Step S6. To be more concrete, it performs processing to classify the risk into 5-step levels and to analyze the cause of a rise of the risk. This processing will be described in detail below. The analysis result in the risk analysis portion 28 is stored in the risk calculation result history DB 26f and also sent to the client terminal 1 via the communication portion 24.

In Step S8, the client terminal 1 displays the risk state on the display portion 12 according to the analysis result sent from the risk management apparatus 2. This display will be described in detail below.

In Step S9, the risk management apparatus 2 determines whether the monitoring is to be terminated. The monitoring is terminated through a specific manipulation on the operation portion 13 (or the operation portion 23). When the operation to terminate the monitoring is performed (Step S9: YES), the processing is terminated. When the operation to terminate the monitoring is not performed (Step S9: NO), the flow proceeds to Step S10, in which whether a specific time t has elapsed or not is determined. The specific time t is a time interval in a case where the data is acquired periodically from the security device 3 in Step S2, and it is set to a value, for example, 30 seconds or one minute. The term, "real time", referred to in the invention means a real time by taking this specific time t into account. In a case where the specific time t has not elapsed (Step S10: NO), the flow returns to Step S9. In a case where the specific time t has elapsed (Step S10: YES), the flow proceeds to Step S2 to acquire the security information from the security device 3 again for the processing in Step S3 and the following steps to be performed.

The method of calculating the vulnerability F in Step S3 of FIG. 2 will now be described with reference to FIG. 3 through FIG. 10 in accordance with a concrete example. As has been descried, the vulnerability F is determined by three factors including an individual, an asset, and a space.

Initially, the method of calculating the vulnerability of individual will be described. FIG. 3 shows an example of an assessment table to assess the vulnerability of individual employed by a company or the like. Assessment items set herein are items relating to the attributes of an individual, such as the type of employment, authorization of asset handling, age, and the length of service, and items relating to the measurement results on specific activities, such as the frequency of use of the assets, the number of procedural mistakes, and the number of entry and leave errors. For each assessment item, 5-step vulnerability scores from 1 point to 5 points are set. Herein, the larger the score point, the higher the vulnerability becomes.

The number of procedural mistakes means, for example, the number of cases where an individual moved the asset by a route different from the predetermined route, the number of cases where an individual needed a time longer than the standard time when he moved the asset, and the number of cases where an individual failed to return the asset on time. These cases can be counted using the RFIC tags 6 attached to an asset A or an individual P. The number of entry and leave errors means, for example, the number of cases when the card read result in the entry and leave management apparatus 4 showed an error when an individual made an attempt to enter a room where he has no authorized access, and the number of cases where the card read result showed an error when an attempt by an individual who has authorized access to enter a room with another individual who has no authorized access, so-called tailgating, is detected. These cases can be counted on the basis of the information from the entry and leave management apparatus 4.

The vulnerability of individual is classified into five ranks A through E depending on a total value found by adding up the points assigned to the respective assessment items in the table of FIG. 3. FIG. 4 shows an example of the rank table in such a case. Each rank is set with a coefficient that indicates the vulnerability quantitatively. Both the tables of FIG. 3 and FIG. 4 are stored in the risk calculation parameter DB 26e in FIG. 1.

For example, according to the table of FIG. 3, in the case of an employee whose type of employment is a full-time worker (1 point), who has the asset handling authorization as a user (4 points), who is in his thirties (4 points), whose length of service is 1 to 14 years (3 points), whose frequency of use of assets is 20 times or more (5 points), whose number of procedural mistakes is 1 to 2 (2 points), and whose number of entry and leave errors is 0 (1 point), a total of the scores is 20 points. The vulnerability level is therefore determined to be Rank B (=0.5) from the Table of FIG. 4.

In this manner, the vulnerability level on the basis of a total of the points in the respective assessment items is determined for each employee. This vulnerability level is the parameter that indicates the vulnerability of individual for an employee in question. FIG. 5 is an example of an individual basis table in which the vulnerability levels thus determined are correlated with the IDs (identification information) of the respective individuals. This table is stored in the personal information DB 26b of FIG. 1.

The method of calculating the vulnerability of asset will now be described. FIG. 6 shows an example of an assessment table to assess the vulnerability of asset. This table is stored in the risk calculation parameter DB 26e of FIG. 1. Assessment items set herein are various items as to whether there is a procedure necessary when handling an asset, whether the asset is operated according to the procedure, whether the asset is stored in the safe, whether the key of the safe is handled strictly, whether the location of the asset can be identified, whether a movement error of the asset can be detected, and whether an action can be taken in the event of a loss of the asset. Herein, 5-step vulnerability levels are set for the respective assessment items. As with the case of FIG. 4, the vulnerability levels are formed of ranks A through E and coefficients corresponding to the respective ranks. Herein, the larger the coefficient, the higher the vulnerability becomes.

Figure 7:
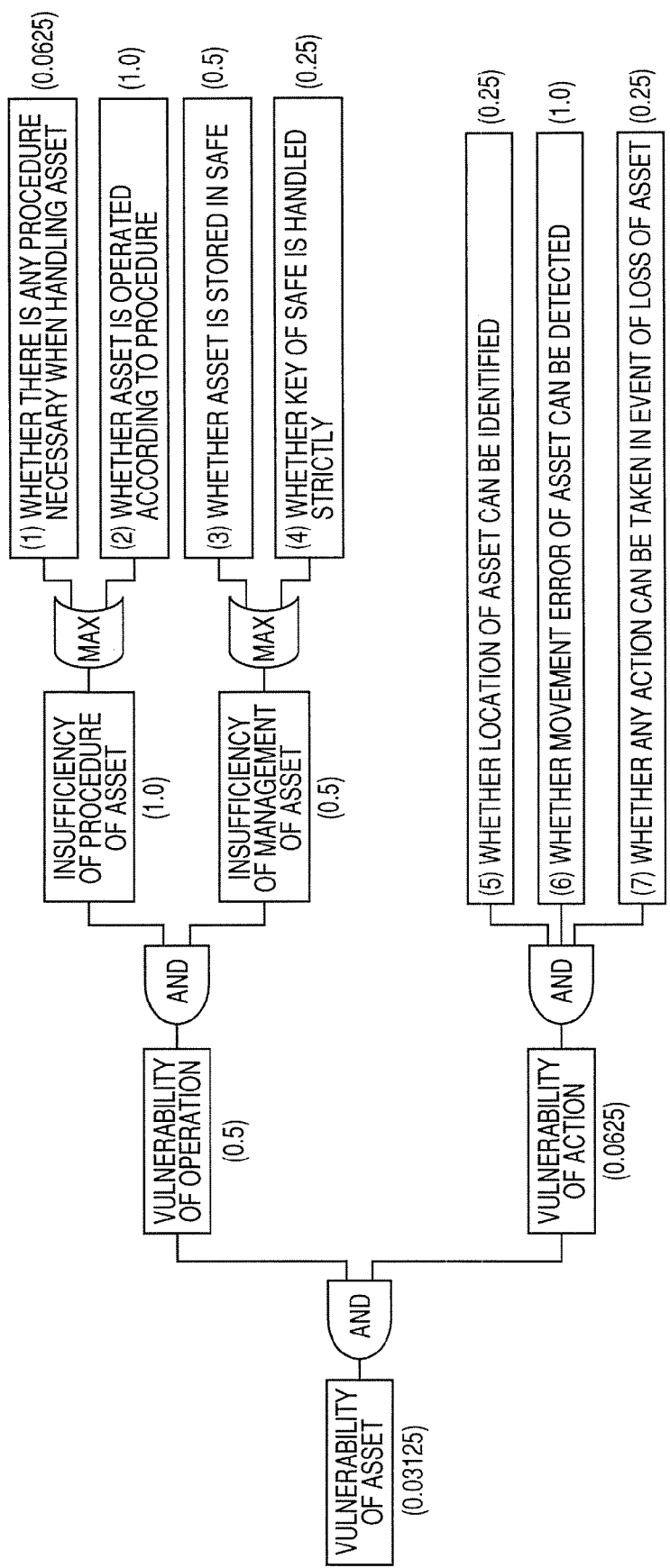
FIG. 7 is a view showing a calculation algorithm of the vulnerability of asset.

In the case of the vulnerability of asset, the calculation method is different from that of the vulnerability of individual described above. Herein, after the vulnerability levels are determined for the respective assessment items in the table of FIG. 6, the vulnerability of asset is found in accordance with a calculation algorithm as shown in FIG. 7. This computation is performed in the risk calculation portion 27 of FIG. 1. In FIG. 7, circled numbers correspond to the numbers assigned to the assessment items of FIG. 6. Also, the sign, "MAX", indicates that the maximum value among plural vulnerability levels is adopted, and the sign, "AND", indicates that the product of plural vulnerability levels is computed. The numerical values in parentheses indicate the numerical values of the vulnerability levels in a concrete example described below.

For example, referring to the items 1 and 2 in the table of FIG. 6, in a case where there is a procedure necessary when handling the asset (level E=0.0625) but the asset is not operated in accordance with the procedure (level A=1.0), as is shown in FIG. 7, 1.0 is adopted as a parameter indicating the insufficiency of the procedure of the asset. Also, referring to the items 3 and 4 of this table, in a case where the asset is stored in something without the lock (level B=0.5) and the key of the safe is kept in the same space where the safe is present while the safe is locked (level C=0.25), as is shown in FIG. 7, 0.5 is adopted as a parameter indicating the insufficiency of the management of the asset. By finding the product of these two parameters (1.0×0.5), the value, 0.5, is calculated as a parameter indicating the vulnerability of operation. Also, referring to the items 5, 6, and 7 of this table, in a case where the location of the asset can be identified in a partial region (level C=0.25) but a movement error of the asset cannot be detected (level A=1.0) while an action can be taken within 20 minutes in the event of a loss of the asset (level C=0.25), as is shown in FIG. 7, the value, 0.0625, is calculated from the product as a parameter indicating the vulnerability of action. By finding the product of 0.5 indicating the vulnerability of operation and 0.0625 indicating the vulnerability of action, 0.03125 is calculated as the vulnerability of asset.

The method of calculating the vulnerability of space will now be described. Herein, the space is divided to a space of storage where the asset is stored and a space of use where the asset is used, and the vulnerability is found separately for each space. This is attributed to a difference in nature of crime to be found between the space of storage and the space of use. Hereinafter, assume that the space of storage is a space where access is restricted and the space of use is a space where access is not restricted and individuals are free to enter and leave.

FIG. 8 is an example of an assessment table to assess the vulnerability of a space of storage. This table is stored in the risk calculation parameter DB 26e of FIG. 1. Assessment items set herein are various items as to whether there are plural entrances, whether there is an access opening to the outside, whether the asset handling is viewable, whether a monitor camera is installed, whether an entry and leave management apparatus is operated, and whether an individual entering the room can be identified. Herein, 5-step vulnerability levels are set for the respective assessment items. As with the case of FIG. 6, the vulnerability levels are formed of ranks A through E and coefficients corresponding to the respective ranks. Herein, the larger the coefficient, the higher the vulnerability becomes.

FIG. 9 shows an example of an assessment table to assess the vulnerability of the space of use. This table is stored in the risk calculation parameter DB 26e of FIG. 1. Assessment items set herein are various items as to whether fixtures are lost frequently, whether there is a rule to make a report upon occurrence of a problem, whether any quick action can be taken upon the occurrence of a problem, whether employees know the faces and names of the other employees, whether an individual without an ID is allowed to enter and leave, whether there is an access door to the outside, whether there is a door always open or a free-access door, whether there is an access opening to the outside, whether an individual around the asset can be identified, whether the asset handling is viewable, whether a monitor camera is installed, whether there is something available to hide the asset, and whether personal belongings can be brought in. Herein, 5-step vulnerability levels are set for the respective assessment items. As with the case of FIG. 6, the vulnerability levels are formed of Ranks A through E and coefficients corresponding to the respective ranks. Herein, the larger the coefficient, the higher the vulnerability becomes.

Figure 10:
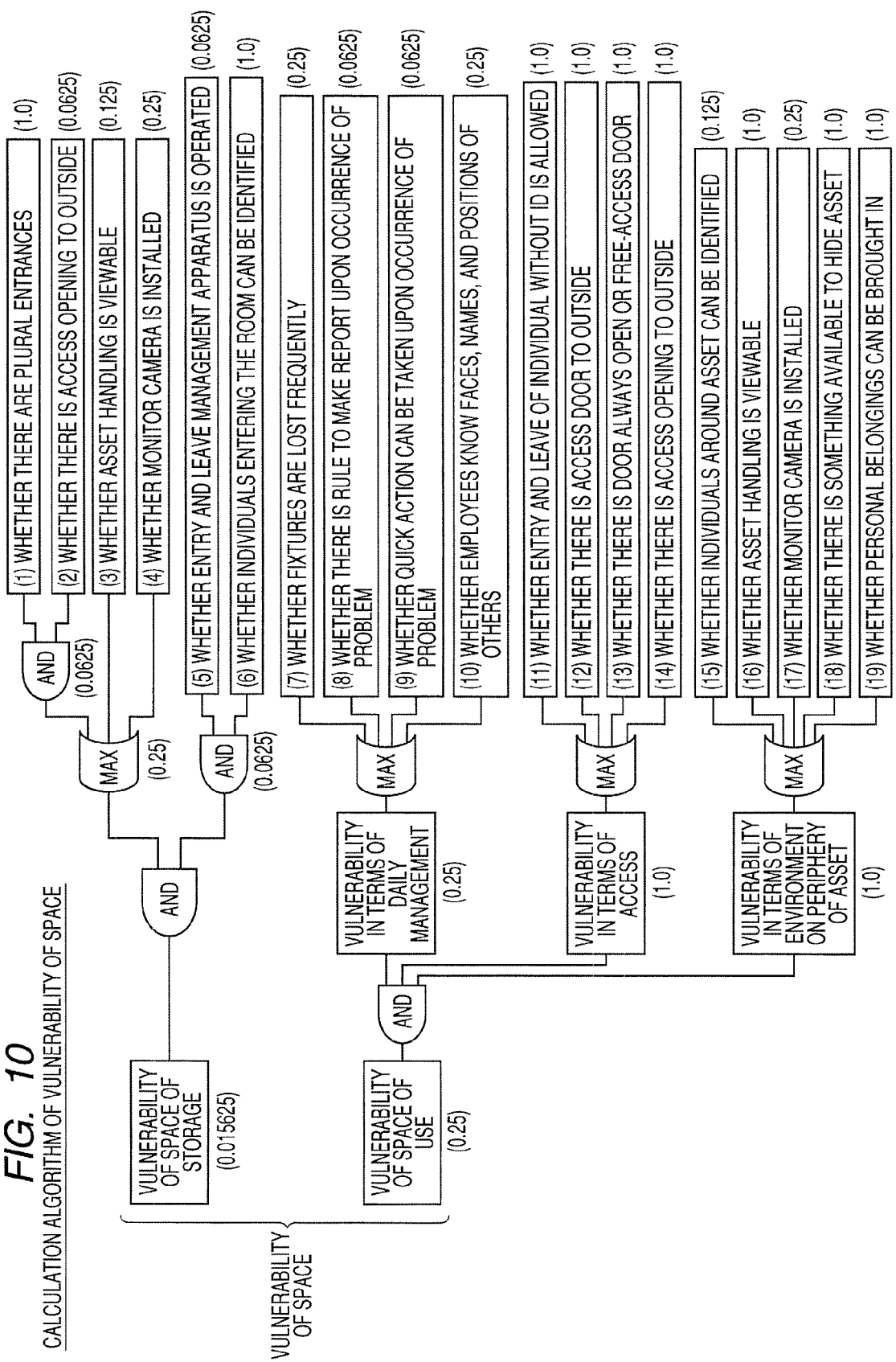
FIG. 10 is a view showing a calculation algorithm of the vulnerability of space.

In the case of the vulnerability of space, the calculation method is also different from that of the vulnerability of individual. Herein, after the vulnerability levels are determined for the respective assessment items in the tables of FIG. 8 and FIG. 9, the vulnerability is found for each of the space of storage and the space of use in accordance with a calculation algorithm as shown in FIG. 10. This computation is carried out in the risk calculation portion 27 of FIG. 1. In FIG. 10, circled numbers correspond to the numbers assigned to the assessment items of FIG. 8 and FIG. 9. Also, as with FIG. 7, the sign, "MAX", indicates that the maximum value among plural vulnerability levels is adopted, and the sign, "AND", indicates that the product of plural vulnerability levels is computed. The numerical values in parentheses indicate the numerical values of the vulnerability levels in a concrete example described below.

For example, in a case where the vulnerability of the space of storage is to be found, with reference to the items 1 through 6 of FIG. 8, when there are plural entrances (level A=1.0), there is no access opening to the outside (level E=0.06), the inside of the room is unviewable from the corridor (level D=0.125), the monitoring camera is installed but there is a blind spot that cannot be covered (level C=0.25), the entry and leave management apparatus is operating (level E=0.0625), and any individual with the ID is allowed to enter the room (level A=1.0), as is shown in FIG. 10, 0.015625 is calculated as the vulnerability of the space of storage.

In a case where the vulnerability of the space of use is to be found, with reference to the items 7 through 10 of FIG. 9, when the fixtures are lost occasionally (level C=0.25), there is a rule to make a report upon the occurrence of a problem (level E=0.0625), a quick action is taken upon the occurrence of a problem (level E=0.0625), and the employees know the faces and the names of the other employees but do not know any further information (level C=0.25), as is shown in FIG. 10, 0.25 is calculated as a parameter indicating the vulnerability in terms of daily management. With reference to the items 11 through 14 of FIG. 9, when an individual without an ID is allowed to enter and leave (level A=1.0), there is an access door to the outside (level A=1.0), there is a door always open or a free-access door (level A=1.0), and there is an access opening to the outside (level A=1.0), as is shown in FIG. 10, 1.0 is calculated as a parameter indicating the vulnerability in terms of access. Also, with reference to the items 15 through 19 of the table of FIG. 9, when the attributes and the number of individuals around the asset can be acquired (level D=0.125), there is nothing that blocks the line of sight and the state of use of the asset is viewable (level A=1.0), the monitoring camera is installed but there is a blind spot that cannot be covered (level C=0.25), there is something available to hide the asset (level A=1.0), and personal belongings can be brought in (level A=1.0), as is shown FIG. 10, 1.0 is calculated as a parameter indicating the vulnerability in terms of the environment on the periphery of the asset. From the product of the three parameters thus calculated (0.25×1.0×1.0), that is, the vulnerability in terms of daily management, the vulnerability in terms of access, and the vulnerability in terms of the environment on the periphery of the asset, as is shown in FIG. 10, 0.25 is calculated as the vulnerability of the space of use.

The risk calculation portion 27 in the risk management apparatus 2 multiplies the respective values of the vulnerability of individual, the vulnerability of asset, and the vulnerability of space calculated in the manner described above to calculate the comprehensive vulnerability F quantitatively. In short, let Fh be the vulnerability of an individual around the asset, Fa be the vulnerability of the asset present in the space, and Fs is the vulnerability of the space where the asset is stored or used, the vulnerability F can be found in accordance with the following equation:

$$F = Fh \times Fa \times Fs \qquad (2).$$

The risk calculation portion 27 performs a computation in accordance with Equation (1) using the vulnerability F found in accordance with Equation (2), and the internal crime probability N and the asset value A described above to calculate PML (Probable Maximum Loss), which is the final risk value. As can be understood from the description above, the risk value PML indicates the risk that the asset will be stolen by an internal crime in a place (room) where the asset is stored or used as an amount of money.

Incidentally, of the internal crime probability N, the vulnerability F, and the asset value A, which are the factors that determine the risk value PML, N is a fixed value determined according to the number of employees in the workplace, and calculated as: N=k·X, where k is a constant and X is the number of employees in the workplace. On the contrary, F×A is a value that dynamically varies with the situation at a current point in time. For example, even in a case where the vulnerability of the room (space) is high, when the asset that has been stored in this room is now moved to another place and is no longer present in this room, A=0 from this point in time and the risk value PML=0. Also, even in a case where the asset value A is large, when there is no one in the room where the asset is placed, F=0 and the risk value PML=0 at this point in time. However, when an individual enters into the room, the risk value is no longer 0 from this point in time, and the risk value varies to a value corresponding to the vulnerability level of this individual. When a case where the vulnerability of this individual in the room is level D and a case where the vulnerability level of this individual is level B are compared, it is natural that a risk of the internal crime is higher in the latter case.

In the system of FIG. 1, the location of an individual is identified by reading the ID of the tag 6 attached to this individual by the tag reader 52, and the vulnerability level of this individual can be acquired by referring to the individual basis table (FIG. 5) in the personal information DB 26b according to the ID. Also, the location of the asset can be identified by reading the ID of the tag 6 attached to the asset by the tag reader 52, and the type and the amount of the asset can be acquired by referring to the asset information DB 26c according to the ID. Accordingly, in this system, because the individual and the asset and the location thereof can be identified by exploiting the tags 6 attached to the individual and the asset, it is possible to dynamically monitor a risk of an internal crime by understanding the vulnerability F and the asset value A in real time. It is thus possible to take an action appropriately according to the situation.

A concrete example of the display in Step S8 of FIG. 2 will now be described with reference to FIG. 11 through FIG. 17.

Figure 11:
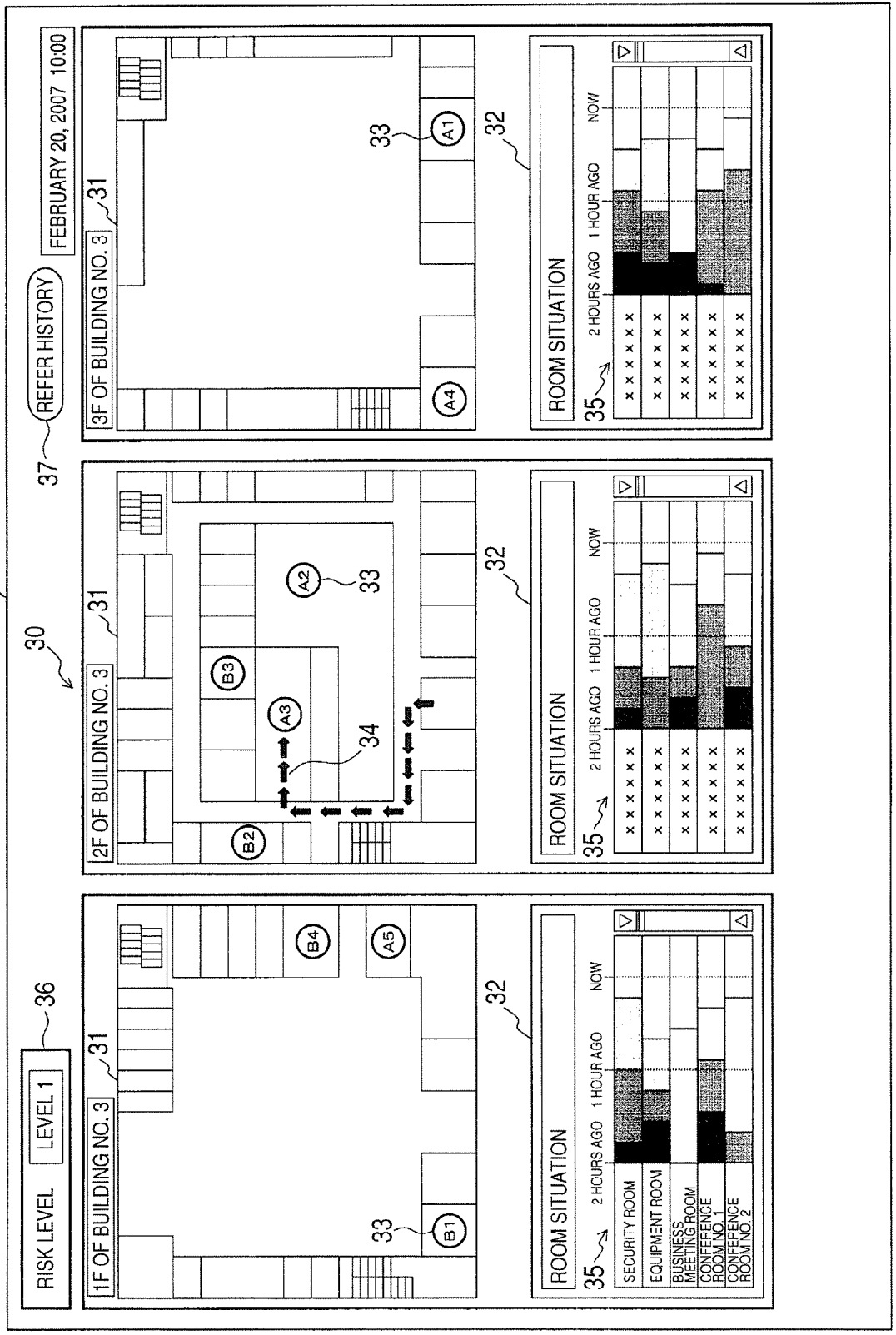
FIG. 11 is a view showing an example of a monitor screen in a normal state.

FIG. 11 shows an example of a monitor screen 12a displayed on the display portion 12 of the client terminal 1. The risk states in the rooms inside the workplace monitored by the risk management apparatus 2 are shown on the monitor screen 12a. More specifically, risk information of each room in every floor of the building is displayed in real time on a risk information display portion 30, and the current risk level among the 5-step risk levels (level 1 to level 5) is displayed on a risk level display portion 36. The level 1 is a state where the risk is the lowest and the level 5 is a state where the risk is the highest. Reference numeral 37 denotes a history refer button to make a transition to a history display screen 12b (FIG. 13) described below. The display program to display the foregoing information is pre-installed in the storage portion 16.

In the risk information display portion 30, reference numeral 31 is a floor layout chart, and marks A1 through A5 and B1 through B4 representing the assets 33 are displayed in the rooms where the assets are present. A1 through A5 represents the assets in the form of money, and B1 through B4 represent the assets in the form other than money, such as equipment and commodities. In a case where the asset is moved to another place, a movement track as is denoted by reference numeral 34 is displayed. As has been described, the tag 6 is attached to each asset 33, and the location of the asset 33 is detected by the location management apparatus 5. Hence, when the asset 33 is moved, it is possible to keep the track of such a movement by the risk management apparatus 2. The movement track 34 is displayed as a movement route from the place detected earlier in a case where the asset 33 has been continuously detected in the moved place for a time period shorter than a specific time. In a case where the asset 33 has been detected in the moved place over the specific time, the movement track 34 is not displayed.

In the risk information display portion 30, reference numeral 32 denotes a separate risk display portion that displays a risk level of each room, and the transition of the risk level of each room from two hours ago to the present is displayed thereon in the form of a bar graph 35. The bar graph 35 is displayed in a color corresponding to the level of a risk, and a bar in a denser color indicates a higher risk level. The risk level display portion 36 described above displays the value of the currently highest risk level among the risk levels in all the places. Because FIG. 11 is an example of a normal state where no abnormality occurs, the current risk levels of the respective rooms are all at "level 1" and "level 1" is displayed on the risk level display portion 36.

The risk levels described above are determined by the processing in Step S7 of FIG. 2. More specifically, upon receipt of the risk value PML of each room calculated in accordance with Equation (1) above from the risk calculation portion 27, the risk analysis portion 28 in the risk management apparatus 2 compares the risk value PML with the threshold values and classifies the risk value to any of level 1 through level 5. As has been described, because the risk value PML is expressed as an amount of money, four amounts, $\alpha$, $\beta$, $\gamma$, and $\delta$ ($\alpha<\beta<\gamma<\delta$), are set in advance as the threshold values. The risk analysis portion 28 determines the level according to the amount of PML as follows:

in a case where $0 \leqq PML < \alpha$, level 1;
in a case where $\alpha \leqq PML < \beta$, level 2;
in a case where $\beta \leqq PML < \gamma$, level 3;
in a case where $\gamma \leqq PML < \delta$, level 4; and
in a case where $\delta \leqq PML$, level 5.

These level values are successively accumulated in the risk calculation result history DB 26f. The client terminal 1 displays the current risk level (highest value) on the risk level display portion 36 of FIG. 11 according to the level values accumulated in the risk calculation result history DB 26f, and at the same time, it displays the risk level of each room from two hours ago to the present on the separate risk display portions 32 in the form of the bar graphs 35.

Figure 12:
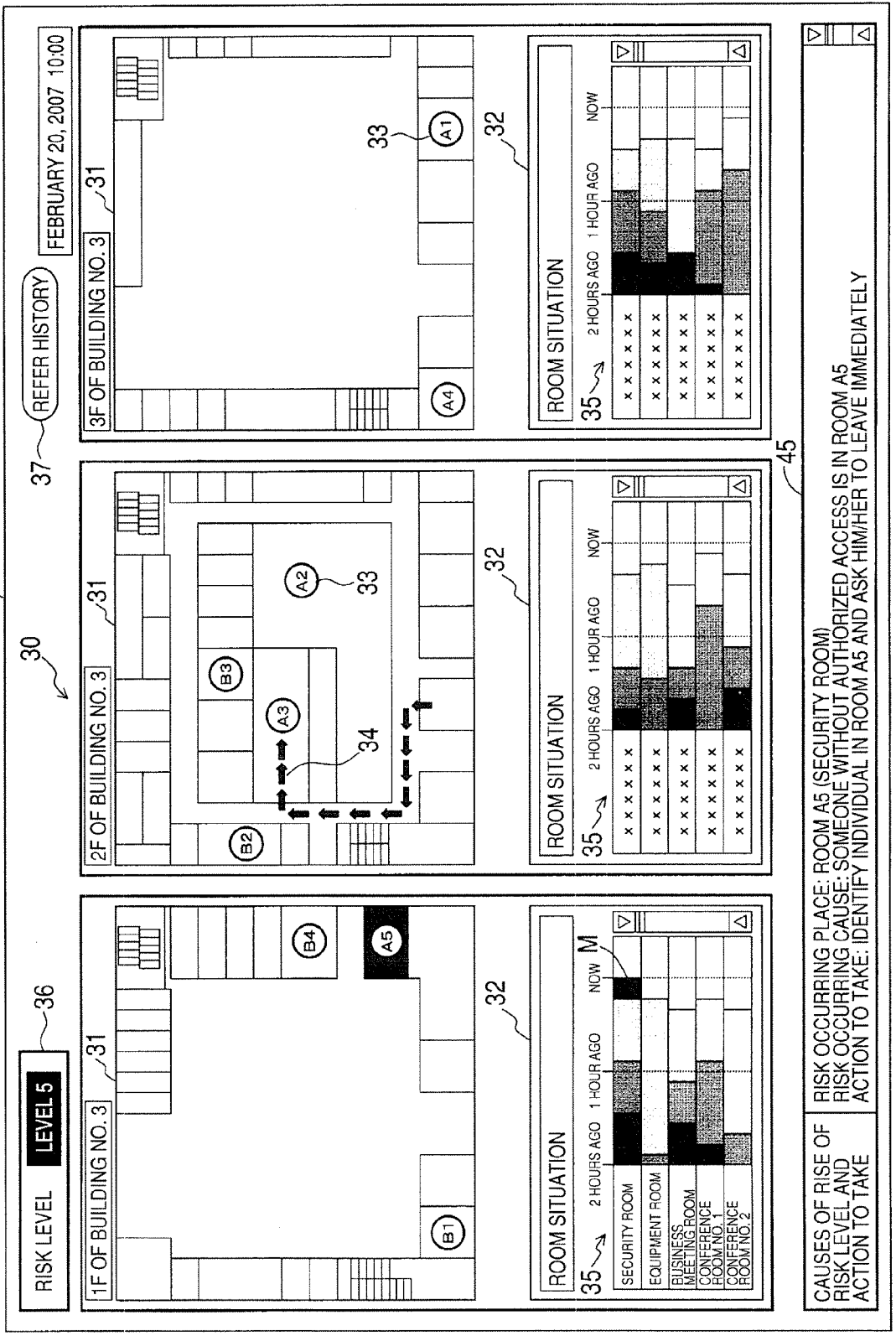
FIG. 12 is a view showing another example of the monitor screen when an abnormality occurs.

FIG. 12 shows an example of the monitor screen 12a in a case where an abnormality occurs. The abnormality herein is a state where an individual who has no authorized access (for example, a part-time employee at Rank A of FIG. 4) enters a room where an asset A5 (for example, three millions yen in cash) is placed in the first floor of the building No. 3, and as a result of a rise of the vulnerability of individual, the risk value PML is changed to level 5. In this case, the risk calculation portion 27 calculates the risk value PML of the room where the asset A5 is present using the changed value of the vulnerability. Also, the risk analysis portion 28 determines the risk level of an internal crime in this room to level 5 on the basis of the risk value PML thus calculated according to the criteria described above.

This result is sent to the client terminal 1. Accordingly, as the current risk level of the room (security room) where the asset A5 is present, a bar in a color corresponding to level 5 as is indicated by a capital M is displayed on the separate risk display portion 32 for the first floor of the building No. 3 on the monitor room 12a. Because the risk level of the room where the asset A5 is present has changed to level 5, "level 5" is displayed on the risk level display portion 36. Further, in the floor layout chart 31, the room where the asset A5 is present is displayed in a color corresponding to the risk level 5. It is thus possible to understand the risk level of the room obviously at a glance.

Meanwhile, the risk analysis portion 28 checks the cause of a rise of the risk level to level 5 and an action to take, and sends the result to the client terminal 1. Accordingly, a message box 45 is displayed at the bottom of the monitor screen 12a, in which the location where the risk is occurring, the cause of the occurrence of the risk, and an action to take are displayed. Hence, it is possible to take an action against the risk quickly and accurately by looking this display. The message box 45 is displayed when the risk reaches a specific level or higher (for example, level 4 or higher). However, it may be configured in such a manner that a message of some kind is displayed in a case where the risk is lower than the specific level.

Figure 13:
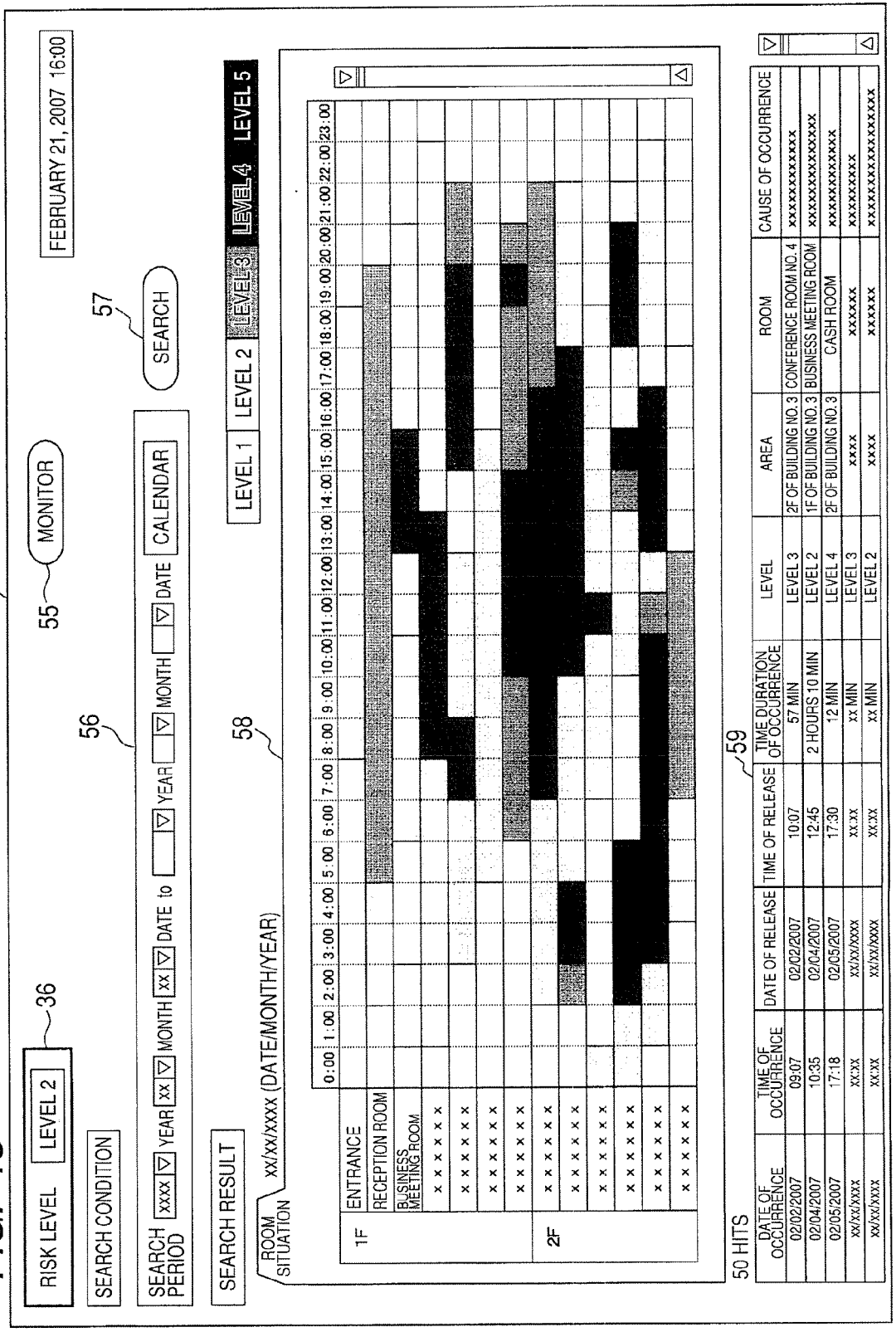
FIG. 13 is a view showing an example of a history display screen.

FIG. 13 shows an example of the history display screen 12b displayed on the display portion 12 of the client terminal 1. The history display screen 12b is displayed when the history refer button 37 shown in FIG. 11 and FIG. 12 is clicked. The history of the risk in a specific period is displayed on the history display screen 12b according to the history recorded in the risk calculation result history DB 26f. Reference numeral 56 denotes a search period input box to input a search period of the history and reference numeral 57 denotes a search button to execute the search. Reference numeral 58 denotes a history display portion, on which is displayed the transition of the risk level of each room during the period specified in the search period input box 56 in the form a bar graph. As with the bar graph 35 of FIG. 11 and related drawings, this bar graph is displayed in a color corresponding to the risk level. Because the search period is a particular day in the example of FIG. 13, variances of the risk level of each room over 24 hours of this particular day are shown in the form of bar graphs. Reference numeral 59 denotes a search result display portion to display thereon the result of the history search in the form of a list. The risk level display portion 36 is the same as those shown in FIG. 11 and FIG. 12, and the current risk level is displayed thereon as has been described (this level is not directly related to the display on the history display portion 58). Reference numeral 55 denotes a monitor button and the screen returns to the monitor screen 12a of FIG. 11 and related drawings when this button is clicked.

Figure 14:
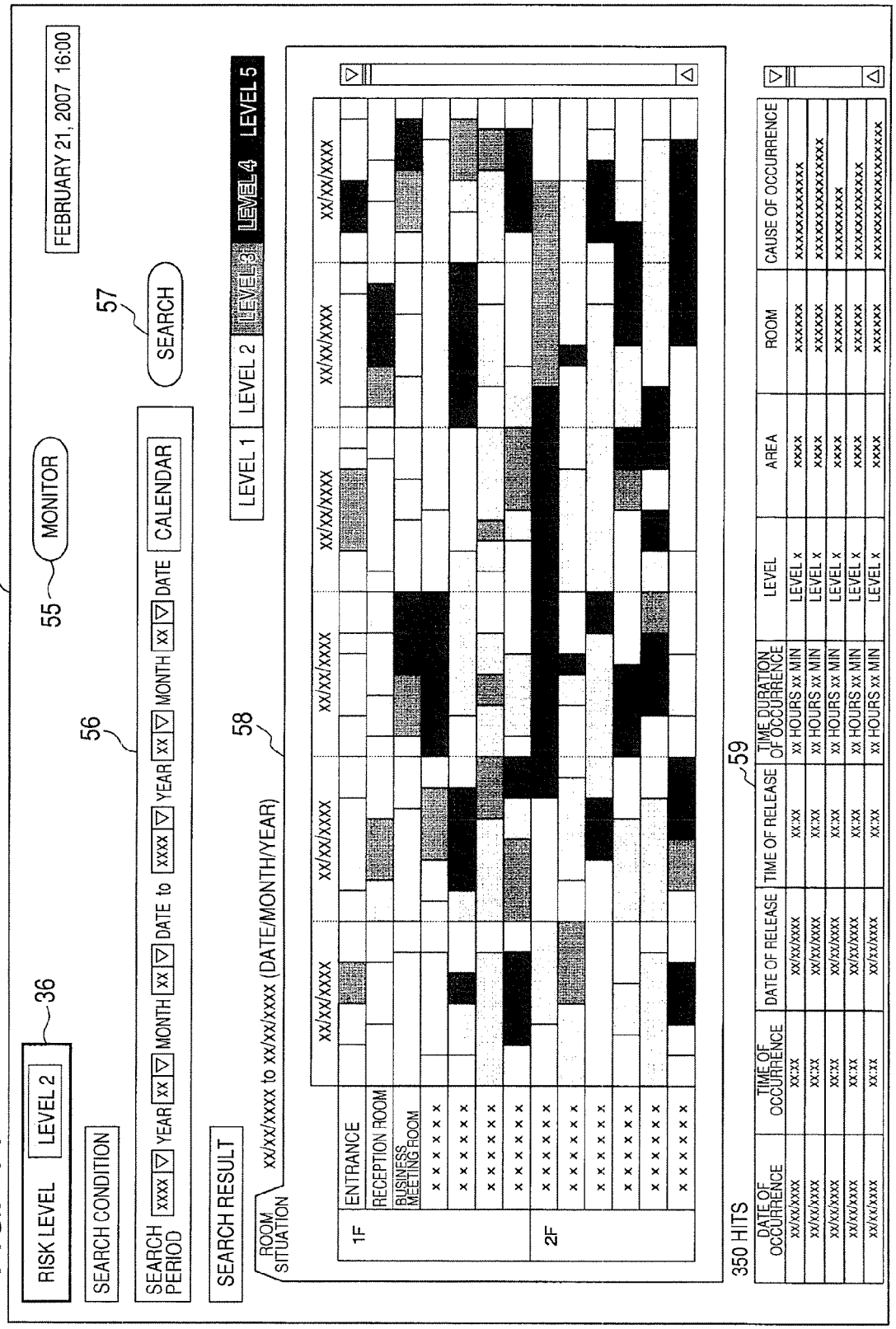
FIG. 14 is a view showing another example of the history display screen.

FIG. 14 shows an example of a display on the history display screen 12b in a case where a search period over several days is specified. In FIG. 14, like portions are labeled with like reference numerals with respect to FIG. 13. In the example of FIG. 14, the search period is six days and variances of the risk level of each room during this period are displayed in the form of bar graphs. Herein, one day is divided into suitable time zones, and the bar graph of each time zone is displayed in a color corresponding to the highest risk level during this time zone.

Alternatively, as another embodiment, it may be configured in such a manner that the scale of the period changes on the history display screen 12b of FIG. 13 when the time box of the history display portion 58 is clicked. For example, the scale may change cyclically from one hour to one day to one week to one month to three months on each click, so that the history corresponding to each period is displayed.

Figure 15:
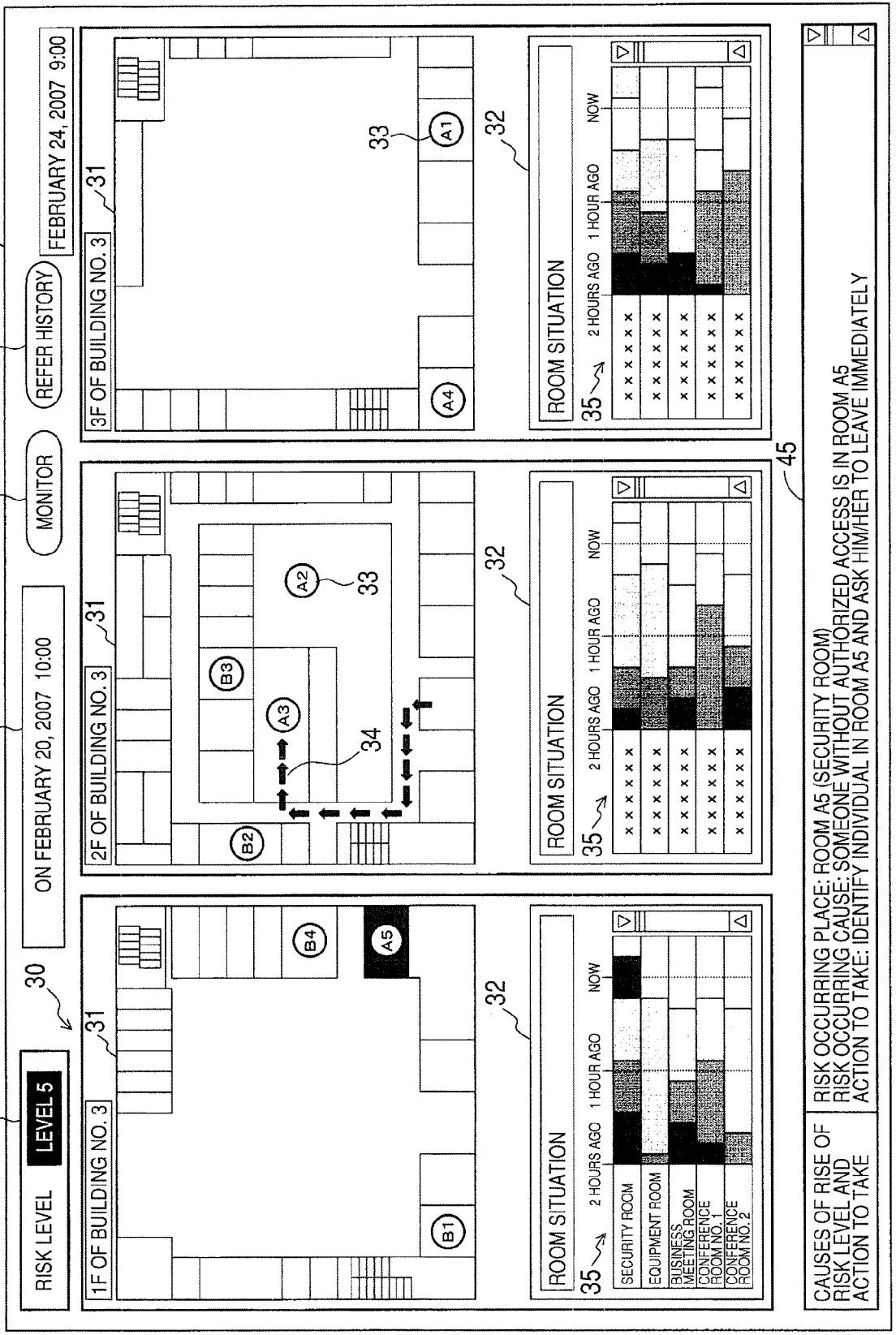
FIG. 15 is a view showing an example of a detailed history display screen.

FIG. 15 shows an example of a detailed history display screen 12c showing a detailed risk state at a given point in time in the past. The detailed history display screen 12c is displayed, for example, by clicking a place in the bar graph display region corresponding to a point in time that the user wishes to be displayed in the history display portion 58 on the history display screen 12b of FIG. 13. A point in time can be specified, for example, in every 10 minutes depending on the place to be clicked. The display content of the detailed history display screen 12c is basically the same as the display content of the monitor screen 12a of FIG. 11 and FIG. 12, and the risk level at the specified point in time (including before and after the specified point in time) is displayed on the separate risk display portions 32 in the form of the bar graphs 35. Reference numeral 46 denotes a point-in-time display portion indicating the point in time specified by the clicking. By displaying the detailed history display screen 12c as described above, it is possible to understand a detailed risk state at an arbitrary point in time in the past.

Herein, it is configured in such a manner that the screen is switched to the detailed history display screen 12c and the point in time is specified by clicking the bar graph display area on the history display screen 12b. However, instead of this configuration, it may be configured in such a manner that an exclusive-use button for the detailed history display is provided on the history display screen 12b, so that the detailed history display screen 12c is displayed when this button is operated and the point in time is specified by inputting the point in time into a point-in-time input box on the detailed history display screen 12c.

As has been described, according to the embodiment above, a risk of an internal crime in each room inside the workplace is calculated and analyzed on the basis of the monitor result of the assets and the monitor result of individuals in the risk management apparatus 2, and the result of calculation and analysis is displayed on the display portion 12 of the client terminal 1. Accordingly, it is possible to understand a risk situation of an internal crime against the assets to protect in real time, which enables an action to be taken appropriately according to the situation. In addition, because the risk is calculated as an amount of money, it is possible to understand the risk comparable to the value of the assets accurately.

In the embodiment above, because the risk state is analyzed using the vulnerability of individual calculated quantitatively, it is possible to understand a risk of an internal crime accurately. Further, by finding the vulnerability of asset and the vulnerability of space quantitatively in addition to the vulnerability of individual to calculate the comprehensive vulnerability F quantitatively from the three vulnerabilities of individual, assets, and space, it is possible to understand a risk of an internal crime more accurately. In addition, by calculating the final risk value PML using the vulnerability F, the asset value A, and the internal crime probability N to analyze the risk state on the basis of this risk value, it is possible to understand a risk of an internal crime further more accurately.

Figure 16:
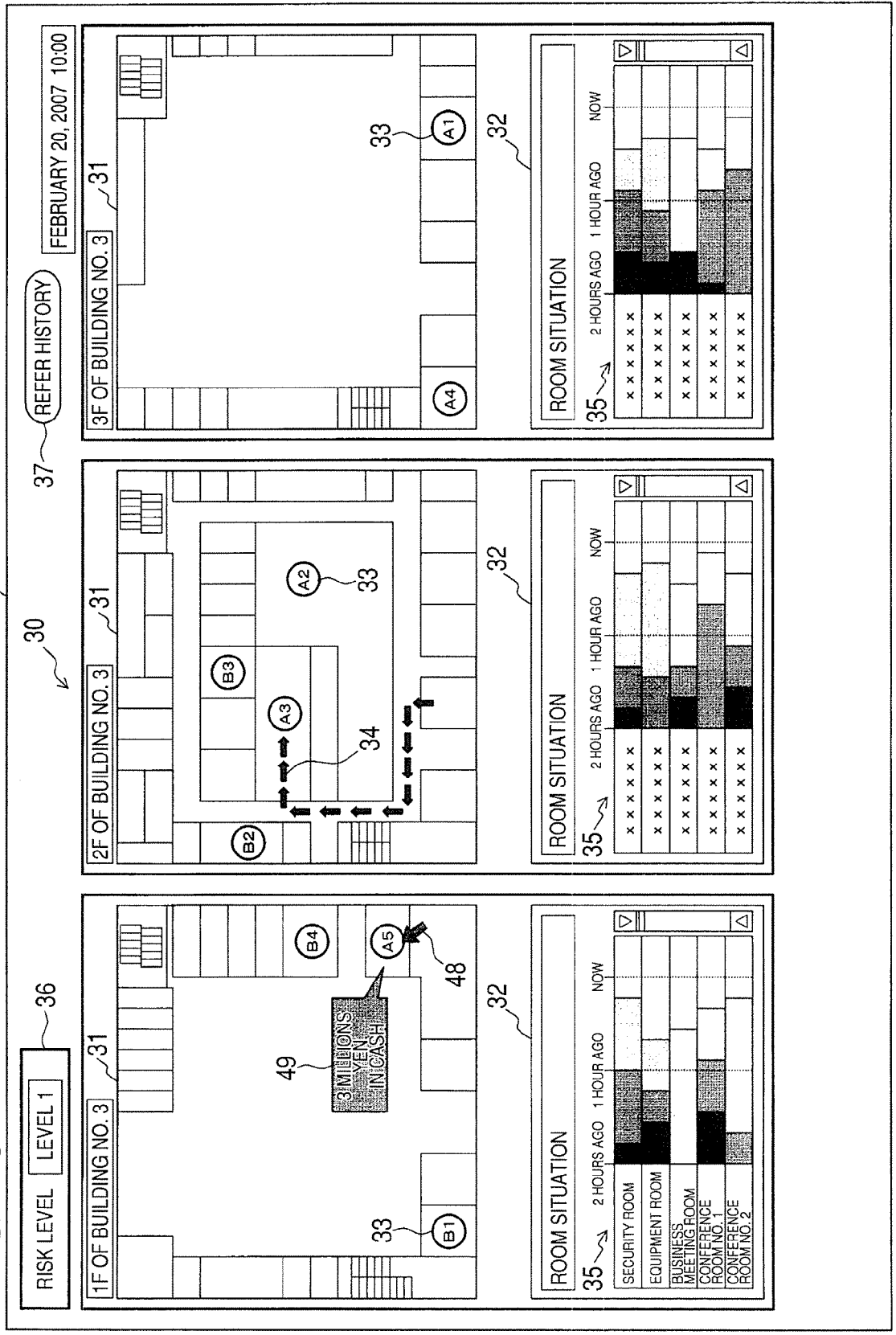
FIG. 16 is a view showing still another example of the monitor screen.

In the invention, various embodiments other than the embodiments described above can be adopted. For example, as is shown in FIG. 16, it may be configured in such a manner that the asset value (amount) 49 of an asset 33 is displayed on the monitor screen 12a when a mouse pointer 48 is placed on the mark representing the asset 33. Alternatively, it may be configured in such a manner that the asset values 49 are displayed for all the assets 33 from the start without the need to operate the mouse pointer 48. Further, it may be configured in such a manner that when money and an asset other than money are present in the same place, the asset value of each and a total of the asset values are displayed.

Figure 17:
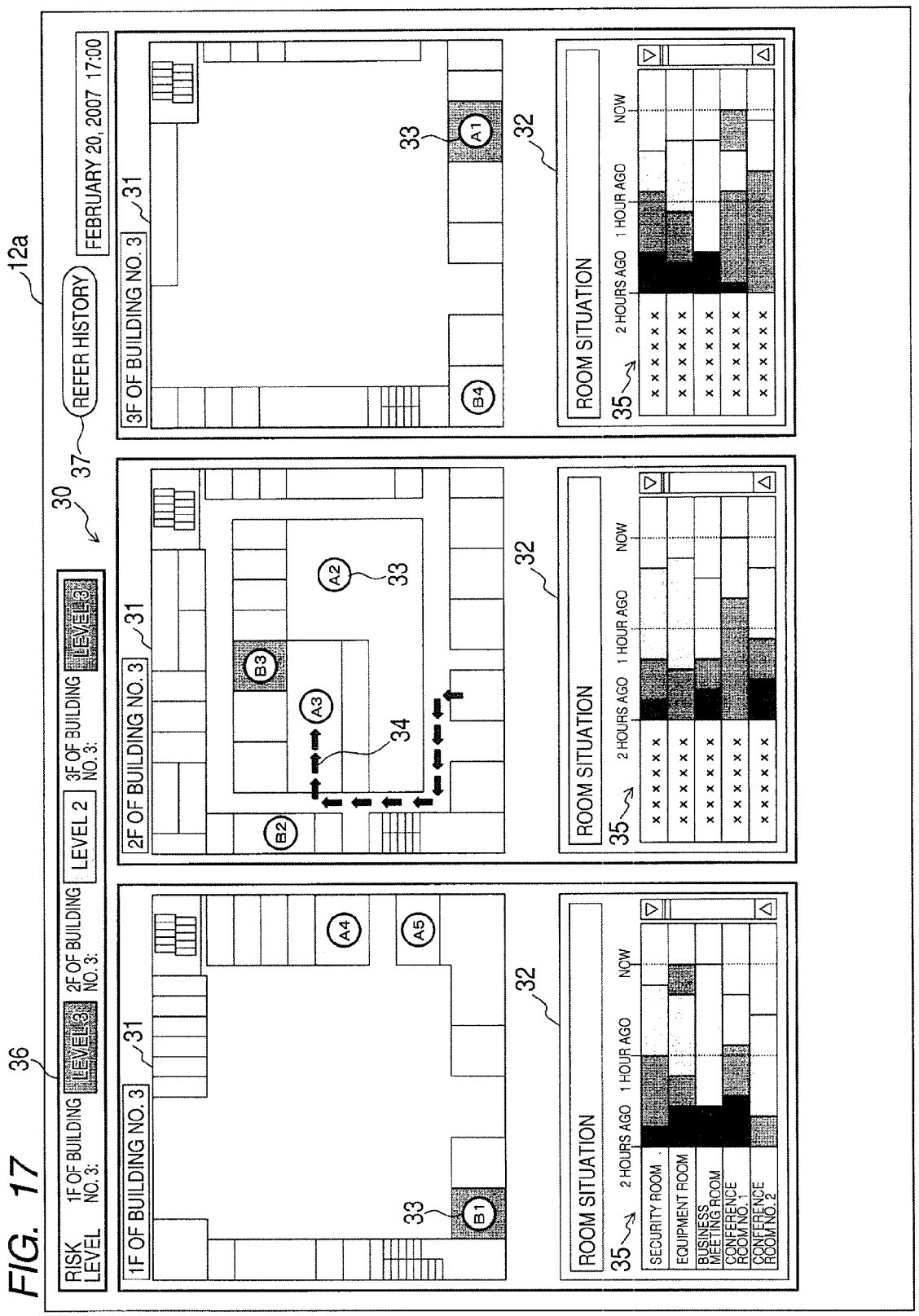
FIG. 17 is a view showing still another example of the monitor screen.

In FIG. 11 through FIG. 16, it is configured in such a manner that only the value of the highest level among the risk levels in all the floors is displayed on the risk level display portion 36. However, as is shown in FIG. 17, it may be configured in such a manner that the highest value of the risk level in each floor is displayed floor by floor on the risk level display portion 36. Although it is not shown in the drawing, as still another embodiment, it may be configured in such a manner that level 1 through level 5 are constantly displayed on the risk level display portion 36 and the corresponding level alone is displayed at the higher luminance, in an enlarged form, or by means of blinking.

Further, in FIG. 1, the client terminal 1 and the risk management apparatus 2 are configured to be isolated from each other. However, the client terminal 1 may be integrated into the risk management apparatus 2, so that the screens as shown in FIG. 11 through FIG. 17 are displayed on the display portion 22 of the risk management apparatus 2.

What is claimed is:

1. A risk monitoring apparatus connected to a security device for monitoring a risk inside a workplace comprising:
    a server, including a processor, comprising;
        a first monitor portion that monitors an asset in a specific place inside the workplace;
        a second monitor portion that monitors an individual inside the workplace;
        a first calculation portion that calculates a vulnerability of the individual being monitored by the second monitor portion quantitatively on the basis of identification information of the individual;
        a second calculation portion that calculates a vulnerability of the asset being monitored by the first monitor portion and a vulnerability of a space where the asset is present quantitatively on the basis of information about the asset;
        a third calculation portion that calculates a comprehensive vulnerability quantitatively on the basis of the vulnerability of the individual calculated in the first calculation portion, the vulnerability of the asset calculated in the second calculation portion, and the vulnerability of the space calculated in the second calculation portion;
        an analysis portion that analyzes a risk state in the specific place on the basis of information about the asset being monitored by the first monitor portion, information about the individual being monitored by the second monitor portion, the vulnerability of the individual calculated in the first calculation portion, and the comprehensive vulnerability calculated in the third calculation portion; and
        an output portion that outputs an analysis result by the analysis portion.

2. The risk monitoring apparatus according to claim 1, wherein said server further comprises:
    a fourth calculation portion that calculates a probable maximum loss (PML) through computation of an equation:

$$PML = N \times F \times A$$

where F is a value of the comprehensive vulnerability, A is an asset value, and N is a probability of an internal crime by an individual inside the workplace given by N=kX, where k is a constant and X is the number of employees in the workplace.

3. The risk monitoring apparatus according to claim 1, wherein said server further comprises:
    a storage portion that stores plural steps of scores pre-set for attributes of individuals and measurement results of a specific behavior of the individuals, and plural steps of levels pre-set according to total values of the scores,
    wherein the first calculation portion calculates the vulnerability of the individual on the basis of the scores and the levels stored in the storage portion.

4. The risk monitoring apparatus according to claim 1, wherein said server further comprises
    a storage portion that stores plural steps of levels pre-set for respective assessment items relating to an operation of the asset, and plural steps of levels pre-set for respective assessment items relating to an action for the asset, wherein the second calculation portion calculates the vulnerability of the asset quantitatively on the basis of the respective levels stored in the storage portion.

5. The risk monitoring apparatus according to claim 1, wherein said server further comprises:

a storage portion that stores plural steps of levels pre-set for respective assessment items relating to a space of storage of the asset, and plural steps of levels pre-set for respective assessment items relating to a space of use of the asset, wherein the second calculation portion calculates the vulnerability of the space quantitatively on the basis of the respective levels stored in the storage portion.

6. A risk monitoring system, comprising:

a risk monitoring apparatus comprising:

a server, including a processor, comprising:

a first monitor portion that monitors an asset in a specific place inside the workplace;

a second monitor portion that monitors an individual inside the workplace;

a first calculation portion that calculates a vulnerability of the individual being monitored by the second monitor portion quantitatively on the basis of identification information of the individual;

a second calculation portion that calculates a vulnerability of the asset being monitored by the first monitor portion and a vulnerability of a space where the asset is present quantitatively on the basis of information about the asset;

a third calculation portion that calculates a comprehensive vulnerability quantitatively on the basis of the vulnerability of the individual calculated in the first calculation portion, the vulnerability of the asset calculated in the second calculation portion, and the vulnerability of the space calculated in the second calculation portion;

an analysis portion that analyzes a risk state in the specific place on the basis of information about the asset being monitored by the first monitor portion, information about the individual being monitored by the second monitor portion, the vulnerability of the individual calculated in the first calculation portion, and the comprehensive vulnerability calculated in the third calculation portion; and an output portion that outputs an analysis result by the analysis portion; and a security device connected to the risk monitoring apparatus.

7. A risk monitoring method for monitoring a risk inside a workplace, said method being performed by a risk monitoring apparatus comprising a server, including a processor, which performs the acts comprising:

monitoring an asset in a specific place inside the workplace with a first monitor portion;

monitoring an individual inside the workplace with a second monitor portion;

calculating a vulnerability of the individual being monitored by the second monitor portion quantitatively on the basis of identification information of the individual in a first calculation portion;

calculating a vulnerability of the asset being monitored by the first monitor portion and a vulnerability of a space where the asset is present quantitatively on the basis of information about the asset in a second calculation portion;

calculating a comprehensive vulnerability quantitatively on the basis of the vulnerability of the individual calculated in the first calculation portion, the vulnerability of the asset calculated in the second calculation portion, and the vulnerability of the space calculated in the second calculation portion in a third calculation portion;

analyzing a risk state in the specific place on the basis of the information about the asset being monitored by the first monitor portion and the information about the individual being monitored by the second monitor portion, the vulnerability of the individual calculated in the first calculation portion, and the comprehensive vulnerability calculated in the third calculation portion in an analysis portion; and outputting an analysis result in the analysis portion by an output portion.

* * * * *